US008166000B2

(12) United States Patent
Labrie et al.

(10) Patent No.: US 8,166,000 B2
(45) Date of Patent: Apr. 24, 2012

(54) USING A DATA MINING ALGORITHM TO GENERATE FORMAT RULES USED TO VALIDATE DATA SETS

(75) Inventors: Jacques Joseph Labrie, Sunnyvale, CA (US); David Thomas Meeks, Ashland, MA (US); Mary Ann Roth, San Jose, CA (US); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1116 days.

(21) Appl. No.: 11/769,639

(22) Filed: Jun. 27, 2007

(65) Prior Publication Data

US 2009/0006283 A1    Jan. 1, 2009

(51) Int. Cl.
*G06F 17/00* (2006.01)
(52) U.S. Cl. .......................................... 707/694; 706/46
(58) Field of Classification Search ........................ None
See application file for complete search history.

(56) References Cited

U.S. PATENT DOCUMENTS

| | | | |
|---|---|---|---|
| 5,594,900 A * | 1/1997 | Cohn et al. ............................. | 1/1 |
| 5,615,341 A | 3/1997 | Agrawal et al. | |
| 5,692,107 A * | 11/1997 | Simoudis et al. ............... | 706/12 |
| 5,794,209 A | 8/1998 | Agrawal et al. | |
| 5,813,002 A | 9/1998 | Agrawal et al. | |
| 5,943,667 A * | 8/1999 | Aggarwal et al. ..................... | 1/1 |
| 6,078,918 A | 6/2000 | Allen et al. | |
| 6,182,070 B1 | 1/2001 | Megiddo et al. | |
| 6,272,478 B1 * | 8/2001 | Obata et al. ...................... | 706/12 |
| 6,278,997 B1 | 8/2001 | Agrawal et al. | |
| 6,311,173 B1 * | 10/2001 | Levin et al. ...................... | 706/21 |
| 6,542,881 B1 * | 4/2003 | Meidan et al. .................. | 706/45 |
| 6,604,095 B1 * | 8/2003 | Cesare et al. .......................... | 1/1 |

(Continued)

FOREIGN PATENT DOCUMENTS

CN    1435781 A    8/2003

(Continued)

OTHER PUBLICATIONS

English Abstract for CN1435781A, published Aug. 13, 2003, 1 p.

(Continued)

*Primary Examiner* — Robert Timblin
*Assistant Examiner* — Richard Bowen
(74) *Attorney, Agent, or Firm* — David W. Victor; Konrad Raynes & Victor LLP

(57) ABSTRACT

Provided are a method, system, and article of manufacture for using a data mining algorithm to generate format rules used to validate data sets. A data set has a plurality of columns and records providing data for each of the columns. Selection is received of at least one format column for which format rules are to be generated and selection is received of at least one predictor column. A format mask column is generated for each selected format column. For records in the data set, a value in the at least one format column is converted to a format mask representing a format of the value in the format column and storing the format mask in the format mask column in the record for which the format mask was generated. The at least one predictor column and the at least one format mask column are processed to generate at least one format rule. Each format rule specifies a format mask associated with at least one condition in the at least one predictor column.

30 Claims, 6 Drawing Sheets

U.S. PATENT DOCUMENTS

| | | | |
|---|---|---|---|
| 6,609,123 | B1 | 8/2003 | Cazemier et al. |
| 6,836,773 | B2 | 12/2004 | Tamayo et al. |
| 6,850,947 | B1 | 2/2005 | Chung et al. |
| 6,877,012 | B2 | 4/2005 | Ashida et al. |
| 6,941,303 | B2 | 9/2005 | Perrizo |
| 6,954,756 | B2 | 10/2005 | Arning et al. |
| 6,965,888 | B1 | 11/2005 | Cesare et al. |
| 6,973,459 | B1 | 12/2005 | Yarmus |
| 7,028,288 | B2 * | 4/2006 | Wall et al. ............. 717/109 |
| 7,249,118 | B2 | 7/2007 | Sandler et al. |
| 7,266,537 | B2 | 9/2007 | Jacobsen et al. |
| 2002/0091707 | A1 | 7/2002 | Keller |
| 2003/0115280 | A1 * | 6/2003 | Quine et al. ............. 709/207 |
| 2003/0191667 | A1 | 10/2003 | Fitzgerald et al. |
| 2003/0212678 | A1 | 11/2003 | Bloom et al. |
| 2003/0217069 | A1 | 11/2003 | Fagin et al. |
| 2004/0093344 | A1 | 5/2004 | Berger et al. |
| 2004/0093559 | A1 | 5/2004 | Amaru et al. |
| 2004/0189708 | A1 | 9/2004 | Larcheveque et al. |
| 2004/0226002 | A1 | 11/2004 | Larcheveque et al. |
| 2005/0055369 | A1 | 3/2005 | Gorelik et al. |
| 2005/0060313 | A1 | 3/2005 | Naimat et al. |
| 2005/0066240 | A1 | 3/2005 | Sykes et al. |
| 2005/0066263 | A1 | 3/2005 | Baugher |
| 2005/0108631 | A1 | 5/2005 | Amorin et al. |
| 2005/0144552 | A1 | 6/2005 | Kalthoff et al. |
| 2005/0182739 | A1 | 8/2005 | Dasu et al. |
| 2005/0234688 | A1 | 10/2005 | Pinto et al. |
| 2005/0256892 | A1 | 11/2005 | Harken |
| 2006/0004740 | A1 * | 1/2006 | Dettinger et al. ............ 707/4 |
| 2006/0053382 | A1 * | 3/2006 | Gardner et al. ............ 715/764 |
| 2006/0136461 | A1 | 6/2006 | Lee et al. |
| 2006/0136462 | A1 | 6/2006 | Campos et al. |
| 2006/0167579 | A1 | 7/2006 | Fujii et al. |
| 2006/0253435 | A1 | 11/2006 | Nishizawa et al. |
| 2006/0274760 | A1 | 12/2006 | Loher |
| 2007/0073688 | A1 | 3/2007 | Fry |
| 2007/0106785 | A1 * | 5/2007 | Tandon ............. 709/224 |
| 2007/0179959 | A1 | 8/2007 | Sharma et al. |
| 2007/0239769 | A1 | 10/2007 | Fazal et al. |
| 2007/0294221 | A1 | 12/2007 | Chen et al. |
| 2008/0085742 | A1 * | 4/2008 | Karukka et al. ............ 455/569.1 |

FOREIGN PATENT DOCUMENTS

| | | |
|---|---|---|
| CN | 1145901 C | 4/2004 |

OTHER PUBLICATIONS

English Abstract for CN1145901C, published Apr. 14, 2004, 1 p.

Nesvizhskii, A.I., F.F. Roos, J. Grossmann, M. Vogelzang, J.S. Eddes, W. Gruissem, S. Baginsky, and R. Aebersold, "Dynamic Spectrum Quality Assessment and Iterative Computational Analysis of Shotgun Proteomic Data", Molecular & Cellular Proteomics, vol. 5, © 2006, The American Society for Biochemistry and Molecular Biology, Inc., pp. 652-670.

Data Mining Group, "Association Rules" [online], [Retrieved on Nov. 1, 2006]. Retrieved from the Internet at <URL: http://www.dmg.org/v3-1/AssociationRules.html>, 7 pp.

Data Mining Group, "Trees" [online], [Retrieved on Nov. 1, 2006]. Retrieved from the Internet at <URL: http://www.dmg.org/v3-1/TreeModel.html>, 18 pp.

Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.

Hipp, J., U. Guntzer, & U. Grimmer, "Data Quality Mining—Making a Virtue of Necessity", Proceedings of the 6th ACM SIGMOD Workshop on Research Issues in Data Mining and Knowledge Discovery, 2001, pp. 52-57.

Janta-Polczynski, M. and E. Roventa, "Fuzzy Measures for Data Quality", 18th International Conference of the North American Fuzzy Information Processing Society, Jul. 1999, pp. 398-402.

Korn, F., A. Labrinidis, Y. Kotidis, & C. Faloutsos, "Quantifiable Data Mining Using Ratio Rules", The VLDB Journal, 2000, pp. 254-266.

Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, 4pp.

Marcus, A., J.I. Maletic, & K. Lin, "Ordinal Association Rules for Error Identification in Data Sets", Proceedings of the Tenth International Conference on Information and Knowledge Management, 2001, pp. 589-591.

Muller, H., U. Leser, & J. Freytag, "Mining for Patterns in Contradictory Data", Proceedings of the 2004 International Workshop on Information Quality in Information Systems, 2004, pp. 51-58.

Pudi, V., "Data Mining—Association Rules", [online], [retrieved on Nov. 1, 2006], retrieved from the Internet at <URL: http://www.iiit.ac.in/~vikram/mining.html>, 3 pp.

U.S. Appl. No. 11/609,307, filed Dec. 11, 2006, entitled "Using a Data Mining Algorithm to Discover Data Rules", invented by Roth, M.A., B.H. Chard, Y. Saillet, & H.C. Smith, 36 pp.

U.S. Appl. No. 11/779,251, filed Jul. 17, 2007, entitled "Managing Validation Models and Rules to Apply to Data Sets", invented by Labrie, J.J., G. Agrawal, M.A. Roth, & Y. Saillet, 34 pp.

Wang, R.Y., H.B. Kon, and S.E. Madnick, "Data Quality Requirements Analysis and Modeling", Proceedings of the Ninth International Conference on Data Engineering, 1999, pp. 670-677.

Wikipedia, "Decision Tree", [online], [retrieved on Nov. 1, 2006], retrieved from the Internet at <URL: http://en.wikipedia.org/w/index.php?title=Decision_tree&printable=yes>, 7 pp.

Jingyi, D., "Survey of Association Rule Data Mining", © 1994-2009 China Academic Journal Electronic Publishing House, Total 2 pp [with English Abstract on p. 1].

Morgan, S.A. and T.G. Reish, "Implementation of Comprehensive Qualification and Validation of Entry Fields", Disclosure AT8940402, TDB, v38, n2, Feb. 1995, pp. 317-318.

Seekamp, C. and K. Britton, "Dynamic Generation of Rules from Properties to Improve Rule Processing Performance", Disclosure RSW819990242, RD, n429, Article 134, Jan. 2000, p. 172.

Shipway, R.E. and P.M. Tricker, "Data Validation and Correction by Context", Disclosure RO8700150, TDB, Sep. 1971, pp. 1132-1137.

US Patent Application, filed on Jun. 27, 2007, entitled "Using a Data Mining Algorithm to Generate Rules Used to Validate a Selected Region of a Predicted Column", invented by M.A. Roth and Y. Saillet.

Wikipedia, "N-gram", [online], updated Apr. 10, 2007, [Retrieved on May 13, 2007], retrieved from the Internet at <URL: http://en.wikipedia.org/w/index.php?title=N-gram&printable=yes>.

Knobbe, A.J., "Multi-Relational Data Mining", Nov. 22, 2004, 130 pp.

Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.

U.S. Appl. No. 12/165,549, filed Jun. 30, 2008, entitled "Discovering Transformations Applied to a Source Table to Generate a Target Table", invented by T. Bittner, H. Kache, M.A. Roth, & Y. Saillet, 49 pp.

Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm&printable=yes>, 3 pp.

Williams, J., "Tools for Traveling Data", [online], Jun. 1997, [retrieved on Mar. 25, 2008], retrieved from the Internet at <URL: http://www.dbmsmag.com/9706d16.html>, 10 pp.

Amendment 1, Jun. 30, 2011, for U.S. Appl. No. 12/165,549, Total 19 pp.

Amendment 1, Jul. 7, 2011, for U.S. Appl. No. 11/769,634, Total 17 pp.

Amendment 1, Aug. 6, 2009, for U.S. Appl. No. 11/609,307, Total 16 pp.

Amendment 2, Mar. 10, 2010, for U.S. Appl. No. 11/609,307, Total 11 pp.

Final Office Action 1, Dec. 10, 2009, for U.S. Appl. No. 11/609,307, Total 10 pp.

Notice of Allowance 1, Apr. 19, 2010, for U.S. Appl. No. 11/609,307, Total 11 pp.

Notice of Allowance 2, Jun. 28, 2010, for U.S. Appl. No. 11/609,307, Total 9 pp.

Office Action 1, Apr. 7, 2011, for U.S. Appl. No. 11/769,634, Total 40 pp.
Office Action 1, Mar. 30, 2011, for U.S. Appl. No. 12/165,549, Total 39 pp.
Office Action 1, Apr. 6, 2009, for U.S. Appl. No. 11/609,307, Total 26 pp.
Office Action 1, Apr. 5, 2010, for U.S. Appl. No. 11/779,251, Total 29 pp.
Final Office Action 1, Oct. 1, 2010, for U.S. Appl. No. 11/779,251, Total 23 pp.
Amendment 1, Jul. 6, 2010, for U.S. Appl. No. 11/779,251, Total 16 pp.
Amendment 2, Dec. 28, 2010, for U.S. Appl. No. 11/779,251, Total 18 pp.
Final Office Action 1, Sep. 22, 2011, for U.S. Appl. No. 12/165,549, filed Jun. 30, 2008, by T. Bittner et al., Total 31 pp.
Notice of Allowance 1, Aug. 29, 2011, for U.S. Appl. No. 11/779,251, filed Jul. 17, 2007, by J.J. Labrie et al., Total 18 pp.
Notice of Allowance 1, Sep. 20, 2011, for U.S. Appl. No. 11/769,634, filed Jun. 27, 2007 by M.A. Roth et al., Total 19 pp.
Peim, M., E. Franconi, and N.W. Paton, "Estimating the Quality of Answers when Querying over Description Logic Ontologies", Data & Knowledge Engineering, © 2003, Total 25 pp.
Notice of Allowance 2, Dec. 28, 2011 for U.S. Appl. No. 11/769,634, filed on Jun. 27, 2007 by M.A. Roth et al., Total 15 pp. [57.143 (NOA2)].

* cited by examiner

USING A DATA MINING ALGORITHM TO GENERATE FORMAT RULES USED TO VALIDATE DATA SETS

BACKGROUND OF THE INVENTION

1. Field

The present invention relates to a method, system, and article of manufacture for using a data mining algorithm to generate format rules used to validate data.

2. Description of the Related Art

Data records in a database may be processed by a rule evaluation engine applying data rules to determine data records that have column or field values that deviate from the values that are expected by the rules. In the current art, the user manually codes data rules by first analyzing the data visually or using a profiling tool to obtain an understanding of the pattern of a well-formed record. Next a user builds logical expressions that define a set of rules to describe the normal characteristics of records in the set. These rules are then repeatedly executed against data sets to flag records that fail the conditions specified by the data rules and report on trends in failure rates over time.

A user may use a rule editor user interface to create new data rules or modify existing rules. Rules may be expressed in a rule language, such as BASIC, Structured Query Language (SQL), Prolog, etc. The user may then save rules in a rule repository in the rule language or in a common rule format. The user may then select rules from the rule repository and a data set of records to provide to the rule evaluation engine to execute the selected rules against the selected data records to validate the data, capture the results and display the results to the user.

Developing data rules can require a significant amount of user time, effort and skill to analyze patterns in data, especially for large data sets having millions of records with hundreds of columns. Further, rules to validate the format of data in data columns may be further difficult to create because many different formats may be used to record the data, such as different formats for phone numbers, etc. Data quality tools may be used to report the existence and frequency of multiple formats for a given column. However, they provide little help to understand why several formats exist, and, for a given row in the data set, which format is the correct one. The data analyst must use the report to decide which format should be allowed and create the corresponding data rules by hand. Since there may be numerous acceptable formats for data, the resulting validation rule may be too general (e.g. phone matches(999-9999 or 999-999-9999 or 99-99-99-99)), or too restrictive (e.g. phone matches(999-999-9999)) or too complex to build, understand and maintain (e.g. if country= ('USA' or 'US' or 'United States') then phone matches(999-9999 or 999-999-9999 or 9-999-999-9999).

There is a need in the art to provide improved techniques for generating and using format rules to validate the format of data.

SUMMARY

Provided are a method, system, and article of manufacture for using a data mining algorithm to generate format rules used to validate data sets. A data set has a plurality of columns and records providing data for each of the columns. Selection is received of at least one format column for which format rules are to be generated and selection is received of at least one predictor column. A format mask column is generated for each selected format column. For records in the data set, a value in the at least one format column is converted to a format mask representing a format of the value in the format column and storing the format mask in the format mask column in the record for which the format mask was generated. The at least one predictor column and the at least one format mask column are processed to generate at least one format rule. Each format rule specifies a format mask associated with at least one condition in the at least one predictor column.

DETAILED DESCRIPTION

Figure 1:
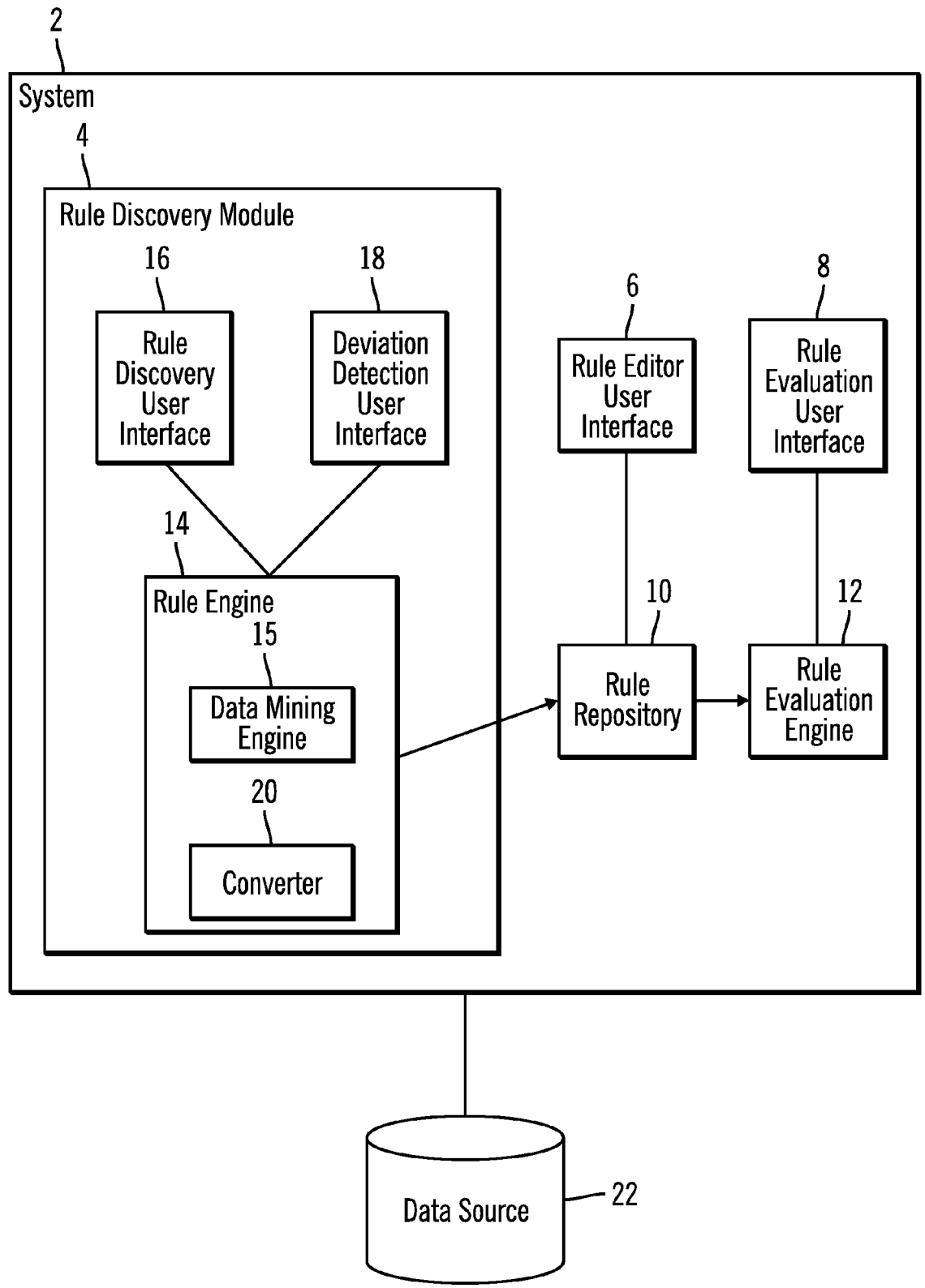
FIG. 1 illustrates an embodiment of a computing environment.

FIG. 1 illustrates a computing environment in which embodiments may be implemented. A system 2 includes program components comprising a rule discovery module 4, a rule editor user interface 6, a rule evaluation user interface 8, a rule repository 10, and a rule evaluation engine 12. The rule discovery module 4 includes a rule engine 14 including a data mining engine 15 and a converter 20, a rule discovery user interface 16, and a deviation detection user interface 18. The program components in the system 2, including components 4, 6, 8, 10, 12, 14, 15, 16, 18, and 20 may comprise software components that are loaded into a computer readable memory in the system 2 and executed by a processor of the system 2. Alternatively, groups of one or more of the components 4, 6, 8, 10, 12, 14, 15, 16, 18, and 20 may by on different systems having different processors and memory. Yet further, the system 2 may comprise multiple processors or distributed processes that execute the components 4, 6, 8, 10, 12, 14, 15, 16, 18, and 20. The system is further coupled to a data source 22 that contains records and fields, where the records may have one or more fields. The data source 22 may be implemented in a computer readable medium, such as a storage device.

The data mining engine 15 may comprise data mining engines known and available in the art. The rule engine 14 may include one or more data mining engines 15 implementing one or more data mining functions/algorithms that analyze data to produce data mining models, which may be in a known format such as the Predictive Model Markup Language (PMML). The converter 20 analyzes the data mining models from the data mining engine 15 (which are not appropriate by default to solve data validation problems), extract the data validation rules, and write the data rules in a common format that can be reused by the rule evaluation engine 12.

The rule discovery module 4 is invoked to automatically generate data rules that validate the values of data records in a table in the data source 22. The data rules indicate one or more conditions for one or more predictive fields that infer within a defined confidence and support level predicted conditions of one predicted field. A predicted condition for a predicted field may specify a value, a range of values or specific values for a predicted field, e.g., age <18, salary >=40000, profession is in {a, b, c}, or other condition types known in the data mining art. These rules may then be applied to data sets to determine field values that deviate from the rules and thus may be erroneous.

The rule engine 14 applies a data mining engine 15 implementing a data mining algorithm to a data set of records to determine data rules for the data. The data mining algorithm determines rules that specify a predicted condition for fields based on one or more predictor conditions in other fields. In one embodiment, the data mining algorithm comprises an association rules algorithm. The converter 20 may further convert data rules in the model language of the algorithm, such as the Predictive Model Markup Language (PMML), into a common rule model language, such as a data validation language. The rule repository 10 may store rules in a common rule format, even if the rules were generated in different formats from different rule algorithms. The rule repository 10 may be implemented in a storage device coupled to the system 2 or the memory of the system 2.

The rule discovery user interface 16 provides a user interface to a user that allows the user to specify parameters for the rule engine 14, such as a minimum confidence level, minimum support level, minimum lift, and maximum rule length for generated rules and one or more data mining algorithms for the rule engine 14 to use. A confidence level indicates a minimum probability at which one or more predictor conditions from predictive fields infer the predicted condition for the predicted field, i.e., the certainty in the records that are analyzed by the rule engine 14 that one or more fields predict a condition in another field. A support level indicates a minimum number or percentage of records of the analyzed records that must satisfy the determined data rule. A minimum lift value may be of the form lift (A->C)=confidence(A->C)/support(C), providing a measure of interest in the rule. Lift values greater than 1.0 indicate that transactions containing A tend to contain C more often than all transactions.

The deviation detection user interface 18 presents to the user those records in the analyzed data set used to produce the data rules that deviate from, i.e., do not satisfy, the rules. This allows the user to review and consider the extent to which the data rules are correctly identifying erroneous data or incorrectly identifying correct records as deviant.

The rule discovery module 4 thus automatically determines data rules for a data set with a confidence metric that measures how strongly the rules are supported by the data sets.

The rule engine 14 provides the generated data rules to a rule repository 10. A rule editor user interface 6 allows the user to edit, modify and delete the generated data rules. For instance, the user may inspect data records that deviate from the generated data rules in the deviation detection user interface 18 and then edit the generated rules in the rule editor user interface 6 based on an analysis of the deviant records and logic of the generated data rules.

The user may use the rule evaluation user interface 8 to select a rule or set of rules from the rule repository to execute against data sets in the data source 22 having records to which the selected rules apply. The selected rules are loaded from the rule repository 10 to a rule evaluation engine 12 which executes the rules against selected tables and records from the data source 22, capturing results and analysis which are displayed to the user via the rule evaluation user interface 8. Upon the rule evaluation engine 12 identifying deviant records, the evaluation engine 12 may apply automatic corrections to the data or present deviant records to the user to review and edit.

The user interfaces 6, 8, 16, and 18 may be implemented in a graphical user interface or through a command line interface in which the user enters textual commands to control the rule engine 14, rule repository 10 and rule evaluation engine 12.

The data mining engine 15 may utilize a data mining association rules algorithm to generate data rules from a data set of records. An example of such an algorithm is the APRIORI algorithm or the algorithm described in U.S. Pat. No. 5,615,341. These algorithms may produce association rules models as defined in the PMML standard. An association rules model contains rules that express an association between items occurring together in a same transaction. For instance, the association algorithm may receive as an input two columns, one for the transaction identifiers (IDs) and one for the items. The association algorithm then searches for all relationships between the items, making no assumptions on the content of the analyzed items, treating them only as strings. In certain embodiments, the association algorithm may also detect the relationship between the conditions, e.g., values, of columns of a table. The data mining engine 15 may then assume that each row in the table is a transaction and generate one item "COL=val" for each column, which is then passed to the association algorithm. The data rules generated by data mining association rule algorithms may follow the form of—if <conditions> then <format_test>, where <format test> is an expression that tests the data format for a column. The data mining engine 15 using a data mining association rules algorithm may generate all data rules that satisfy the specified confidence, support level, and lift.

In certain embodiments, the rule discovery module 4 and rule editor user interface 6 may be on a separate system than the system that includes the rule evaluation engine 12 and rule evaluation user interface 8 to use the generated rules. Further, any of the components of the rule discovery module 4 or other components shown in the system 2 may be implemented on one system or in a distributed computing environment. In one embodiment, the repository 10 is implemented in a separate system from one or more systems including the other components.

Figure 2:
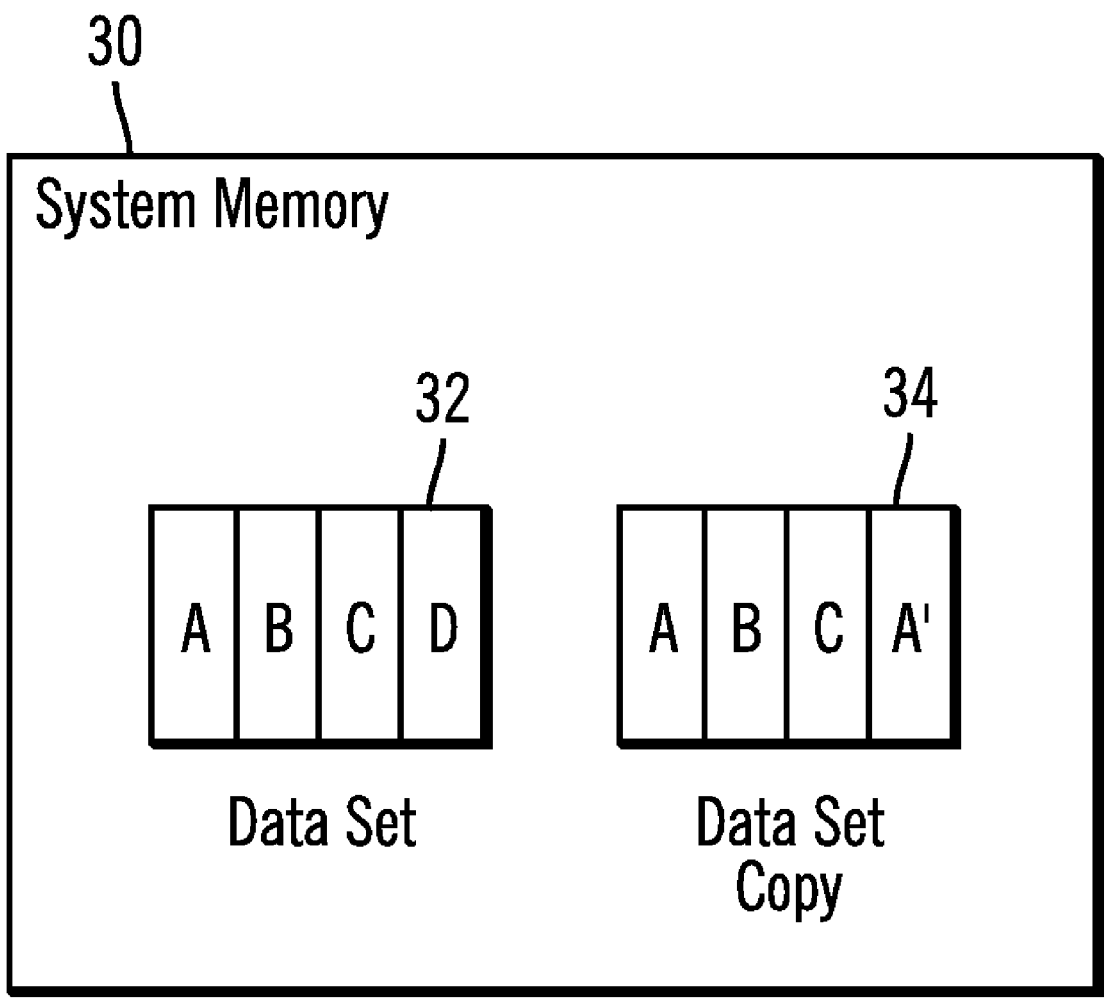
FIG. 2 illustrates an example of data sets subject to format rule discovery operations.

FIG. 2 illustrates an embodiment of the system 2 memory 30 including a data set 32. The data set 32 may comprise a table having four shown columns A, B, C, and D. In one embodiment, the user may select, using the rule discovery user interface 16, one or several format columns (predicted columns) and one or more condition columns (predictor columns). The user seeks to generate format rules for the format columns based on an association with the predictor columns, such that the format rules seek to predict a format of the format columns based on the conditions specified in one or more predictor columns. The user may further select one or more columns to appear in the result set. In the example of FIG. 2, the user selects column A as the format column, column B as the predictor column, and column C as one column to additionally appear in the result set.

The rule engine 14 may generate a data set copy 34 comprising a copy of the data set that includes the format column A, predictor column B, additional column C to appear, and a format mask column A' that includes a format mask for each record generated from the value in the format column for the record. Format mask definitions may provide a mask to represent types of character values that may be present in the format column A. For example, a format mask in the format column A may be generated from the value in the format column A by replacing each character of the value by "9" if the character is a digit, "a" if the character is a lowercase letter, "A" if an uppercase letter, and letting any other character remain unchanged. In other embodiments, other characters may be used for the mask definition to represent types of characters such that the mask definition is well-defined and indicates where digits, lowercase/uppercase letters and special characters are located. In fact not only other characters can be used but also other formats. For instance, an alternative to the suggested "999AA99aaa" format may comprise a regular expression such as "[0-9]{3}[A-Z]{2}[0-9]{2}[a-z]{3}". The rule engine 14 generates association rule predict format masks based on conditions in the one or more predictor columns. The conditions in the predictor columns may comprise the form of col=val, col<val, col between val1 and val2, etc. These rules may be applied by checking whether data records having a value in the predictor column specified in a format rule have a format in their format mask column that complies with the format mask specified in the rule. The format mask and predictor column conditions in the format rules may comprise a discrete value, a range of values or a regular expression defining a set of values.

Figure 3A:
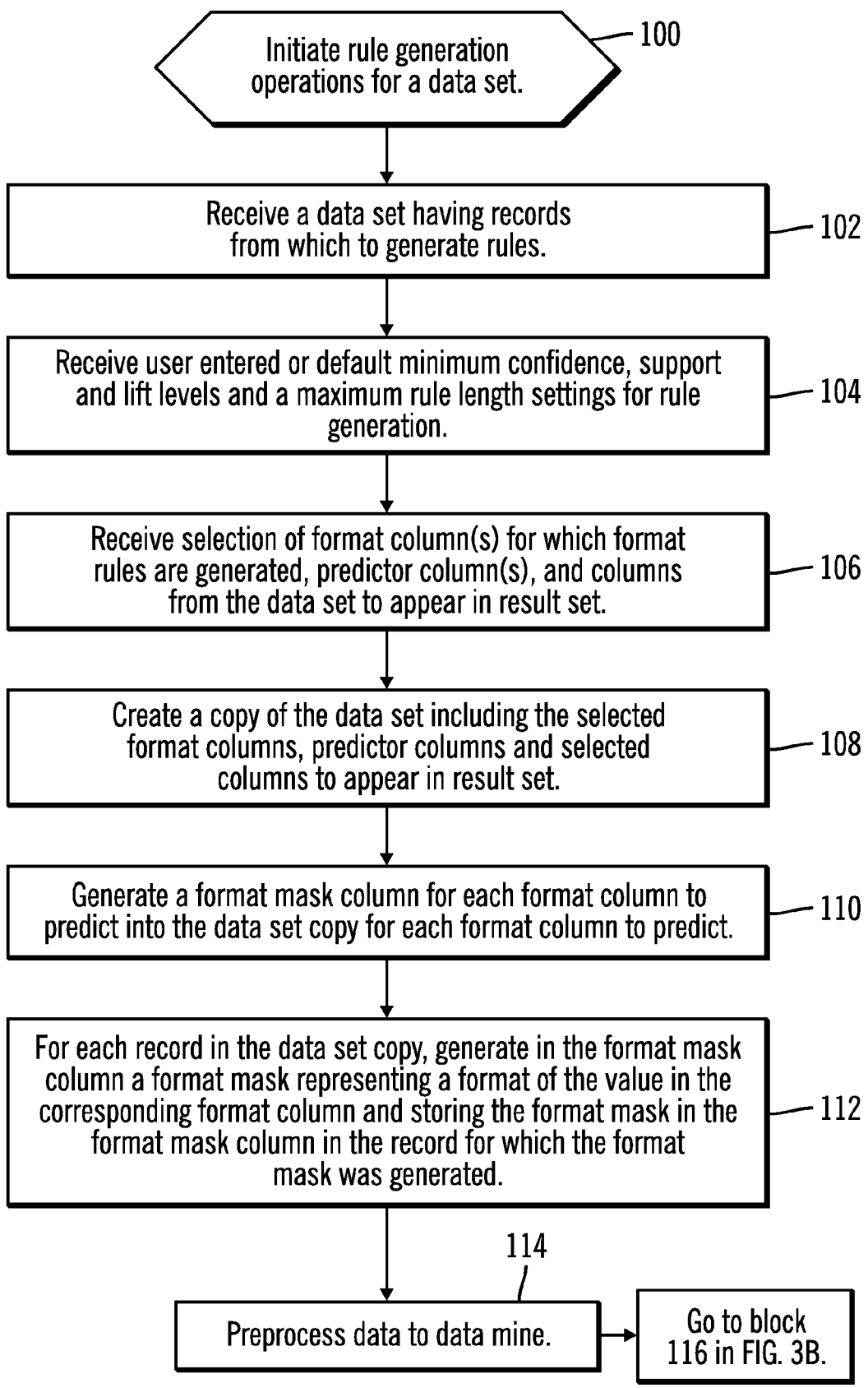
FIGS. 3*a* and 3*b* illustrate an embodiment for generating format rules from a data set.
Figure 3B:
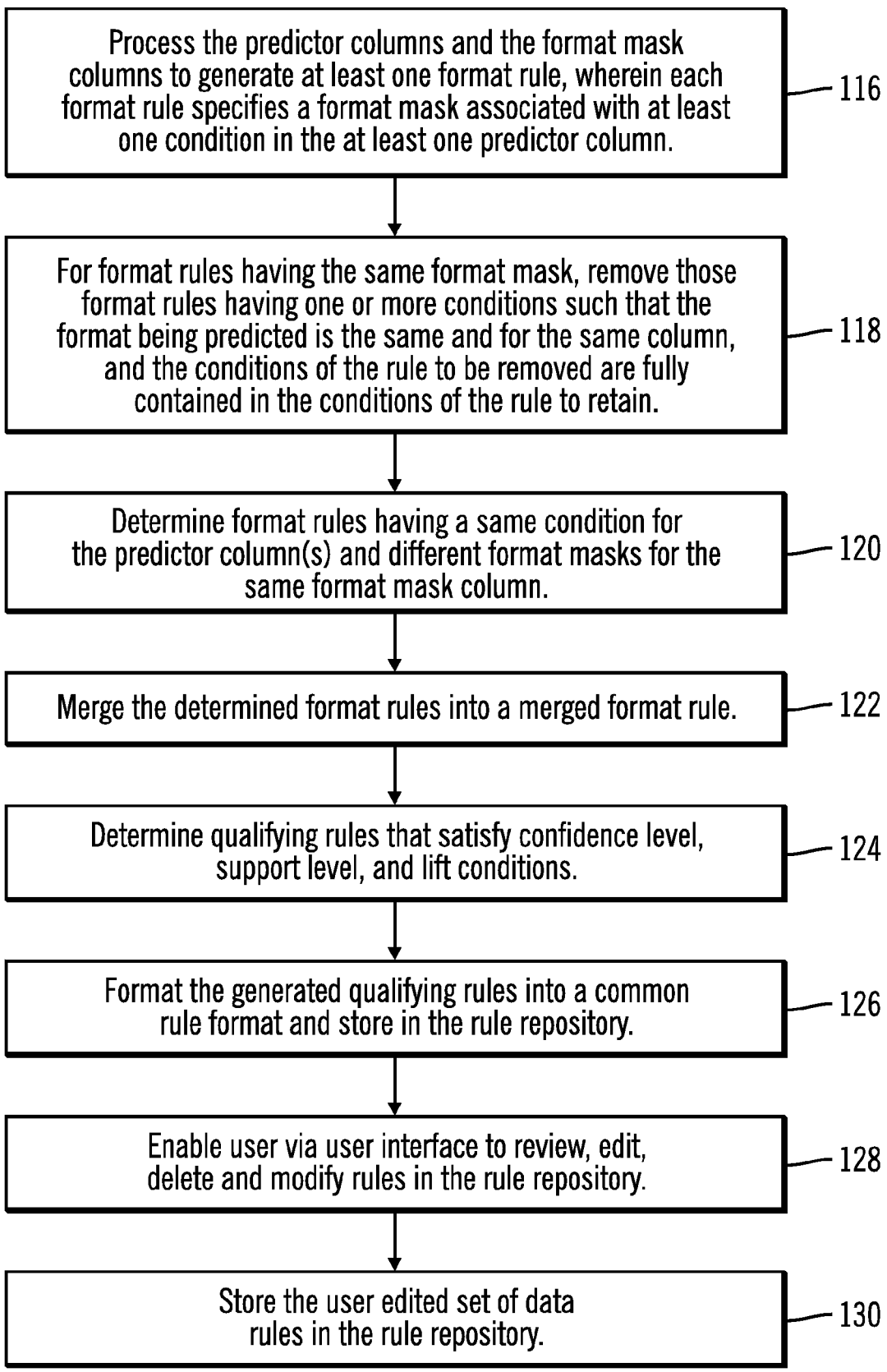

FIGS. 3a and 3b illustrate an embodiment of operations performed by the components of the system 2 to generate data rules from a data set of records in the data source 22. Upon initiating (at block 100) rule generation operations, the rule engine 14 receives (at blocks 102) a data set having records from which to generate rules. The rule engine 14 may further receive (at block 104) the minimum confidence, support and lift levels and a maximum rule length from the rule discovery user interface 16. The minimum confidence level, which may be specified by the user, is a confidence level that the final rules must satisfy, and may be set to a relatively high value, e.g., 90%. The data mining engine 15 may use low minimum confidence level that is used for generating an initial rules set to capture patterns where one condition may lead to different formats. This low minimum confidence level used by the data mining engine 15 to generate the initial rules to consider may be substantially lower, e.g., 5%, than the minimum confidence level specified by the user for the final rule set. This initial rules set is further processed to generate final consolidated rules, each having a confidence level that satisfies the user set minimum confidence level. This low minimum confidence level may be a predefined variable for the data mining engine 15 which the user does not set. The rule engine 14 may further receive (at block 106) selection of one or more format columns for which format rules are generated, one or more predictor column(s) used to predict a format of the format column, and columns from data set to appear in a result set. The result may be generated by applying final format rules to the data set to determine records that do not have a format required or predicted by the rules. This final result set of records is presented with the additional columns of data that the user selected to appear in the result set.

In one embodiment, the rule engine 14 may create (at block 108) a data set copy 34 including the selected format columns, the predictor columns and optionally selected columns to appear in result set from the data set 32. The rule engine 14 may further generate (at block 110) a format mask column into the data set copy 34 for each format column to predict. In an alternative embodiment, the rule engine 14 may perform operations directly on the data set 32 and include the format mask columns in the data set 32, without creating a data set copy 34 to use. For each record in the data set copy 32, the rule engine 14 generates (at block 112) in the format column a format mask representing a format of the value in the corresponding format column and storing the format mask in the format mask column in the record for which the format mask was generated. As discussed the format mask includes a mask for each character in the format column field based on a format mask definition.

The rule engine 14 may then preprocess (at block 114) the data before the data mining engine 15 extracts the data validation rules. Preprocessing the data may involve discretization, which converts values in numerical columns into a categorical range of values. Preprocessing may further involve pivoting the data records in the received data set if the data mining engine 15 used requires pivoted data. For instance, if the data mining engine 15 comprises an association rules algorithm, then the preprocessing operation may involve pivoting the table in a two columns format (transaction ID, item) where each item is "COL=value" and where the numeric values are discretized.

With respect to FIG. 3b, the data mining engine 15 then applies (at block 116) a data mining algorithm to process the predictor columns and the format mask columns to generate at least one format rule, wherein each format rule specifies a format mask associated with at least one condition in at least one predictor column, such that the condition in the predictor column predicts the format mask. The format mask and predictor column conditions in the format rules may comprise a discrete value, a range of values or a regular expression defining a set of values. The rules may be in the PMML model format.

In one embodiment, the data mining engine 15 builds an association rules model with the appropriate parameters and filter conditions to configure a minimum confidence to maximize the number of possible mask format patterns captured for a particular predictor column condition. Using a low minimum confidence, lower than the minimum confidence level specified by the user for the final rule set, increases the number of rules that are initially generated to capture how values in the format column may be recorded in slightly different formats. Each slightly different format in how the value is recorded may result in a different rule in the association rules model. Building a model with low minimum confidence will capture these different variations so they can be merged later into one rule with the same condition and a confidence measure derived from the confidence of each rule. Thus, the data mining engine 15 provides confidence, support, and lift for each generated rule to use when determining which rules to discard. For example, a French phone number can be written as "99-99-99-99-99" or "99 99 99 99 99" or "99.99.99.99.99". Such variations may be captured by separate rules with each having a relatively low confidence as shown below:

[country=France]=>[format=99 99 99 99 99] (15% conf)

[country=France]=>[format=99.99.99.99.99] (55% conf)

[country=France]=>[format=99-99-99-99-99] (25% conf)

The above format rules for the exemplar French phone numbers with the lower confidence variations may be combined in a later step to generate a single rule with a confidence equal to the sum of the individual rule confidence measures, such as the below rule having the combined confidence level:

[country=France]=>[format=99 99 99 99 99 or 99.99.99.99.99 or 99-99-99-99-99] (95%)

The rule engine 14 may remove redundant rules by determining rules having the same format mask and then remove (at block 118) those format rules having one or more conditions such that the format being predicted is the same and for the same column, and the conditions of the rule to be removed, e.g., r2, are fully contained in the conditions of the rule to retain, e.g., r1. The conditions of one rule (r2) are fully contained in another rule (r1) if the condition of r2 is necessarily true if the condition of r1 is true. In other words a rule having the same format mask as another rule is removed if its predictive condition in the predictor column includes the predictive condition of the other rule having the same mask for the same format column. For instance if you have the 2 rules:

(1) IF country=FRANCE AND city=PARIS then POST-ALCODE=99999 (95%)

(2) IF country=FRANCE then POSTALCODE=99999 (95%), then rule (1) can be removed because (2) predicts the same thing in a simpler way and with a similar confidence. For instance, since Paris is in France, the first rule with the additional condition of Paris can be removed. In certain embodiments, the more complex rule, i.e., including more conditions, is only removed if the confidence level of the more complex rule is not significantly better than the simpler rule.

Figure 4:
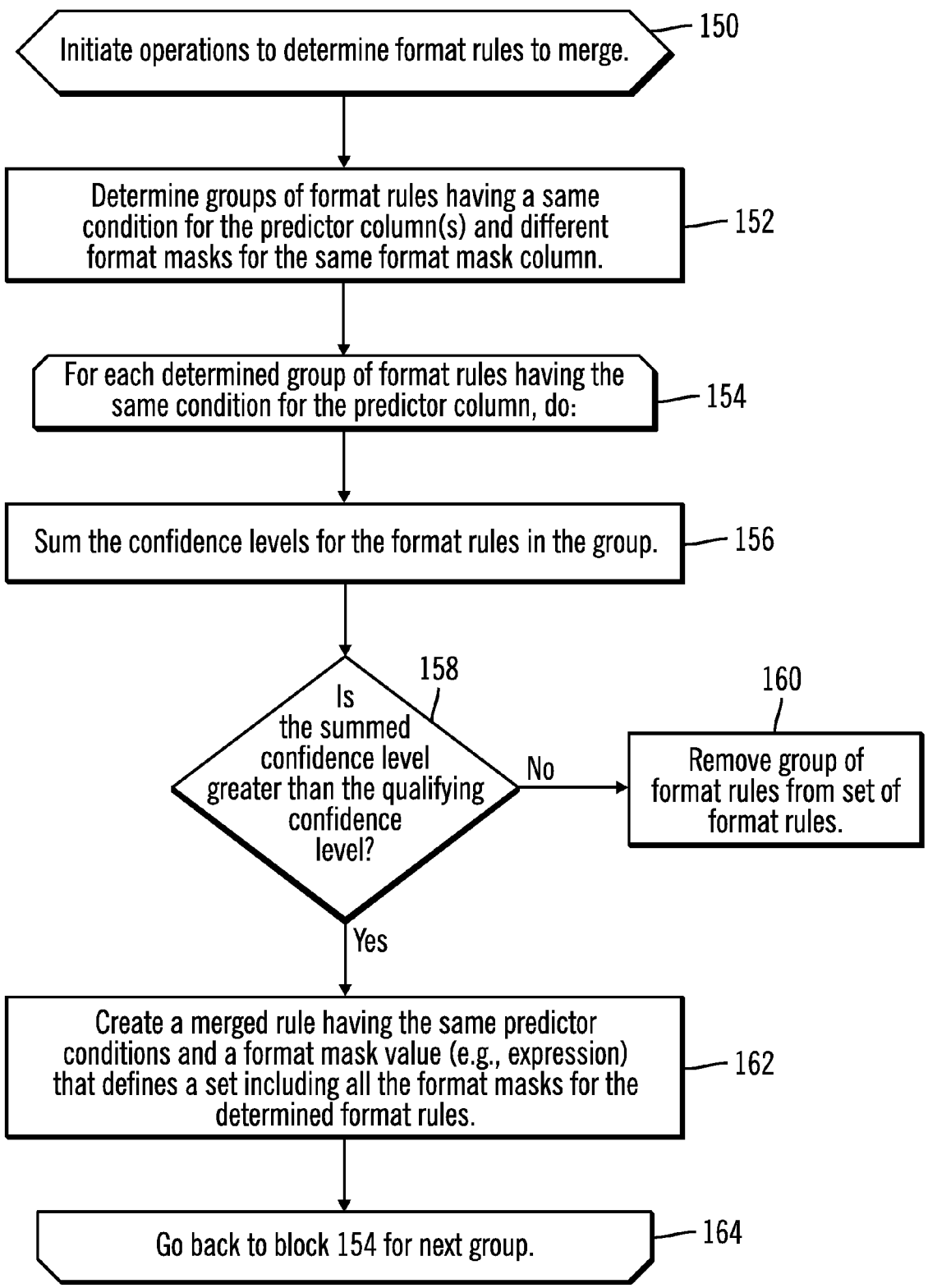
FIG. 4 illustrates an embodiment of operations to merge format rules having the same predictive conditions.

Further redundant rules may further be reduced or consolidated by determining (at block 120) format rules having a same condition(s) for the same predictor column(s) and different format masks for the same format mask column and then merging (at block 122) the determined format rules having the same predictor conditions into a merged format rule. If a rule has multiple predictor columns providing conditions, then rules are merged that have the same conditions for all the predictor columns. FIG. 4 below provides an additional embodiment for merging format rules having the same predictive conditions.

The rules engine 14 determines (at block 124) from the consolidated set of format rules qualifying rules that satisfy the specified confidence and support level conditions. The data mining engine 15 may further apply the qualifying rules to identify records, from the data set or a compatible data set that was processed to generate the data rules, that do not satisfy the rules, i.e., deviate from the generated rules. The deviation detection user interface 18 may then present the determined deviant records to the user to review. This allows the user to analyze whether the rules are appropriately identifying deviant records and to determine rules that may be needed.

The converter 20 may then format (at block 126) the generated qualifying rules, into a common rule format and store the formatted rules in the rule repository 10. For instance, the converter 20 may read the rules, which may be in a rule model format such as PMML, obtained by mining, extract the information contained in them and convert that to the model or language used to define the data validation rules, i.e., the common rule format. The rule editor user interface 6 enables (at block 128) the user to review, edit, delete and modify rules in the rule repository 10. The user may further use the rule editor user interface 6 to store (at block 130) the user edited set of data rules in the rule repository 10.

FIG. 4 provides a further embodiment for merging format rules having the same predictor conditions, such as performed at operations 120 and 122 in FIG. 3b. Upon initiating (at block 150) the operations to determine format rules to merge to consolidate the format rules, the rules engine 14 determines (at block 152) groups of format rules having a same condition for the same predictor column(s) and different format masks for the same format mask column. For each determined group of format rules having the same condition for the predictor columns, the rule engine 14 performs the operations at blocks 154-162. At block 156, the rule engine 14 sums (at block 156) the confidence levels for the format rules in the group. If (at block 158) the summed confidence level is less than the minimum confidence level, then the format rules in the group are removed (at block 160) because the combined or consolidated format rule still does not satisfy the required minimum confidence level specified by the user for a rule to be included in the validation rule set. If (at block 158) the summed confidence level satisfies the minimum confidence level, then the rule engine 14 creates (at block 162) a merged rule having the same predictor conditions and a format mask value (e.g., expression) that defines a set including all the format masks for the determined format rules.

Figure 5:
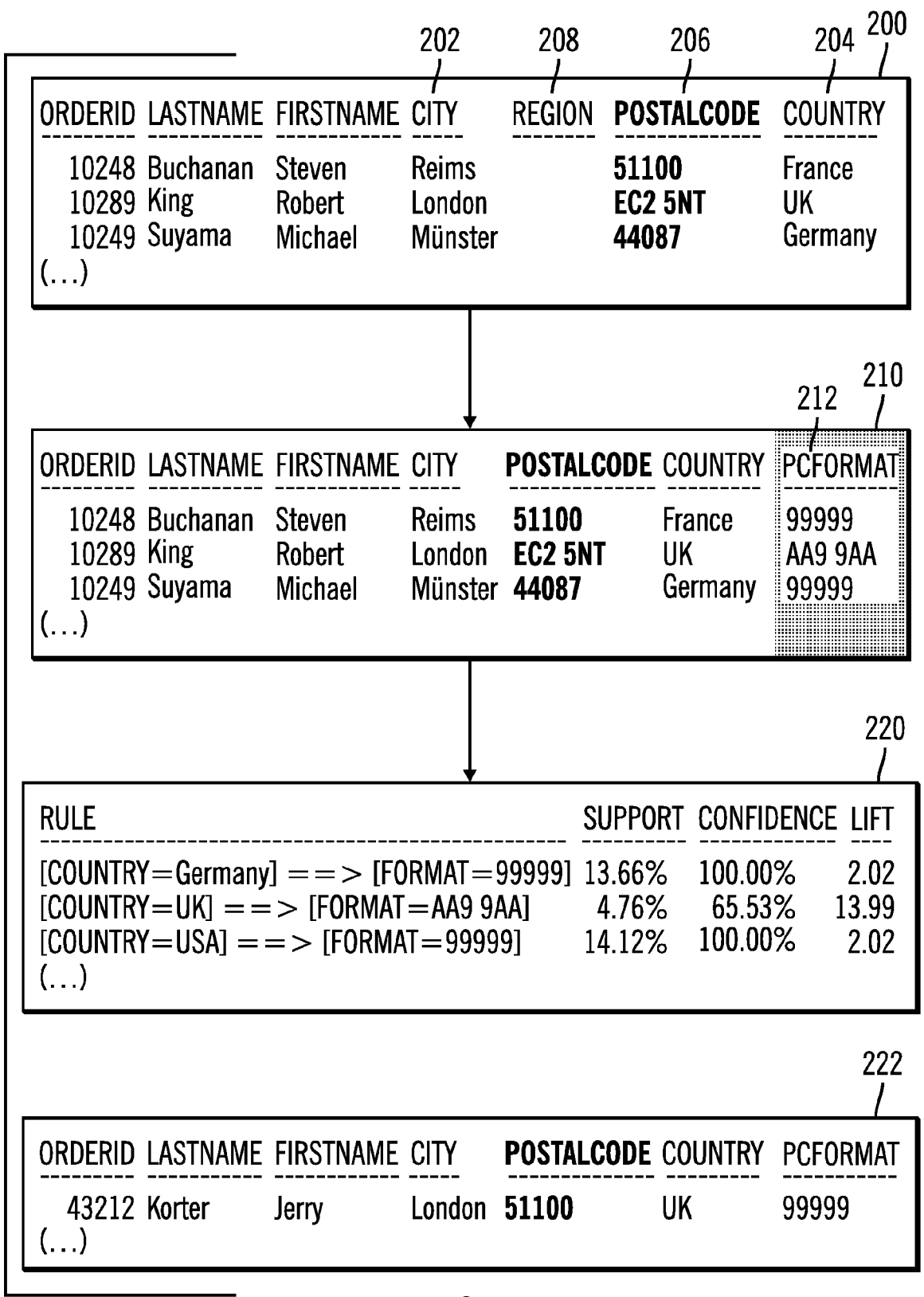
FIG. 5 illustrates an example of how format rules are generated from a data set.

FIG. 5 illustrates an example of how the rules engine may process a data set 200 having seven columns. To determine how the value in the city 202 and country 204 columns may predict the format of the value in postal code column 206, the user would select the predictor columns as the city 202 and country 204 columns and the format column as the postal code column 206. The user may further select to include all columns in the result set except the region column 208. The rules engine 14 may then generate a data set copy 210 having all the selected columns except the region column 208 from the starting data set 200. Further, the rules engine 14 generates the format mask column 212 including masks for each postal code value in the format column 206. The rules engine 14 using the data mining engine 15 then generates a final set of validation rules 220 using the operations of FIGS. 3a, 3b, 4 predicting the format mask for the postal code based on different values for the city and country predictor columns. The rules evaluation engine 12 may then apply the rules 220 to the copy data set 210 or other data set to produce a result set 222 of records that do not satisfy the validation rules 220, which the user may review. Only those columns the user selected to appear are generated into the result set 222, which in the example of FIG. 5 includes all columns except the region column 208 from the initial data set 200.

With the described embodiments, a rule discovery program using a data mining engine may generate format mask rules based on a data set of records that may be used to determine whether the format of data in a selected format column in a data set is in a valid format.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3a, 3b, and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code executed to perform operations, the operations comprising:
    processing a data set having a plurality of columns and records providing data for each of the columns;
    receiving selection of at least one format column for which format rules are to be generated;
    receiving selection of at least one predictor column;
    generating a format mask column for each selected format column in the data set, wherein the format mask column has format masks for the records in the data set;
    for records in the data set, converting a value in the at least one format column to a format mask representing a format of the value in the format column and storing the format mask in the format mask column of the record having the value from which the format mask was generated; and
    processing the at least one predictor column and the at least one format mask column to generate at least one format rule, wherein each format rule specifies a format mask associated with at least one condition in the at least one predictor column such that the rule predicts the format mask based on a value in the predictor column.

2. The article of manufacture of claim 1, wherein the conditions in the at least one predictor column comprises a discrete value, a range of values or an expression defining a set of values.

3. The article of manufacture of claim 1, wherein an association rules algorithm is used to generate an association rules model to detect all possible associations between the values in the at least one predictor column and the format masks in the at least one format column.

4. The article of manufacture of claim 1, wherein the operations further comprise:
    determining a first format rule predicting a same format mask for a same format column as a second format rule;
    determining whether the second format rule includes a simpler condition which is always true when the condition of the first format rule is verified; and
    deleting the first format rule in response to determining that second the format rule includes the simpler condition which is always true when the condition of the first format rule is verified.

5. The article of manufacture of claim 1, wherein the operations further comprise:
    determining format rules having same predictor conditions and different format masks for the same format mask column; and
    merging the determined format rules into a merged format rule.

6. The article of manufacture of claim 5, wherein the merged format rule has the same predictor conditions and a value for the format mask defining a set including the format masks for the determined format rules.

7. The article of manufacture of claim 5, wherein format rules are generated having a low minimum confidence level that is below a minimum confidence level specified by a user, wherein the operations further comprise:
determining whether a sum of the confidence levels for the determined format rules having the same condition for the predictor column exceeds the minimum confidence level, wherein the determined format rules are merged into the merged format rule in response to determining that the sum of the confidence levels exceeds the minimum confidence level.

8. The article of manufacture of claim 7, wherein the operations further comprise:
deleting the determined format rules having the same predictor conditions in response to determining that the sum of the confidence levels does not exceed the minimum confidence.

9. The article of manufacture of claim 1, wherein the operations further comprise:
providing the generated format rules to a user interface to enable a user to edit the generated format rules; and
storing the format rules in a rule repository to be available to use to validate data sets.

10. The article of manufacture of claim 1, wherein converting the value in the format column to the format mask comprises replacing each character of a character type with a representation of the character type.

11. The article of manufacture of claim 1, wherein the operations further comprise:
creating a copy of the data set including the selected at least one format column and the at least one predictor column, wherein the at least one format mask column is included in the copy of the data set, wherein the at least one format mask column was not included in the data set from which the copy was created.

12. The article of manufacture of claim 1, wherein the format mask for one format mask rule comprises a regular expression indicating a format.

13. A system in communication with a data source including a data set having a plurality of columns and records providing data for each of the columns, comprising:
a processor;
a computer readable medium having a rule engine executed by the processor to perform operations, the operations comprising:
processing a data set having a plurality of columns and records providing data for each of the columns;
receiving selection of at least one format column for which format rules are to be generated;
receiving selection of at least one predictor column;
generating a format mask column for each selected format column in the data set, wherein the format mask column has format masks for the records in the data set;
for records in the data set, converting a value in the at least one format column to a format mask representing a format of the value in the format column and storing the format mask in the format mask column of the record having the value from which the format mask was generated; and
processing the at least one predictor column and the at least one format mask column to generate at least one format rule, wherein each format rule specifies a format mask associated with at least one condition in the at least one predictor column such that the rule predicts the format mask based on a value in the predictor column.

14. The system of claim 13, wherein the conditions in the at least one predictor column comprises a discrete value, a range of values or an expression defining a set of values.

15. The system of claim 13, wherein an association rules algorithm is used to generate an association rules model to detect all possible associations between the values in the at least one predictor column and the format masks in the at least one format column.

16. The system of claim 13, wherein the rule engine operations further comprise:
determining a first format rule predicting a same format mask for a same format column as a second format rule;
determining whether the second format rule includes a simpler condition which is always true when the condition of the first format rule is verified; and
deleting the first format rule in response to determining that second the format rule includes the simpler condition which is always true when the condition of the first format rule is verified.

17. The system of claim 13, wherein the rule engine operations further comprise:
determining format rules having same predictor conditions and different format masks for the same format mask column; and
merging the determined format rules into a merged format rule.

18. The system of claim 17, wherein the merged format rule has the same predictor conditions and a value for the format mask defining a set including the format masks for the determined format rules.

19. The system of claim 17, wherein format rules are generated having a low minimum confidence level that is below a minimum confidence level specified by a user, and wherein the rule engine operations further comprise:
determining whether a sum of the confidence levels for the determined format rules having the same condition for the predictor column exceeds the minimum confidence level, wherein the determined format rules are merged into the merged format rule in response to determining that the sum of the confidence levels exceeds the minimum confidence level.

20. The system of claim 19, wherein the rule engine operations further comprise:
deleting the determined format rules having the same predictor conditions in response to determining that the sum of the confidence levels does not exceed the minimum confidence.

21. The system of claim 13, wherein converting the value in the format column to the format mask comprises replacing each character of a character type with a representation of the character type.

22. A method, comprising:
processing a data set having a plurality of columns and records providing data for each of the columns;
receiving selection of at least one format column for which format rules are to be generated;
receiving selection of at least one predictor column;
generating a format mask column for each selected format column in the data set, wherein the format mask column has format masks for the records in the data set;
for records in the data set, converting a value in the at least one format column to a format mask representing a format of the value in the format column and storing the format mask in the format mask column of the record having the value from which the format mask was generated; and processing the at least one predictor column and the at least one format mask column to generate at least one format rule, wherein each format rule specifies a format mask associated with at least one condition in the at least one predictor column such that the rule predicts the format mask based on a value in the predictor column.

23. The method of claim 22, wherein the conditions in the at least one predictor column comprises a discrete value, a range of values or an expression defining a set of values.

24. The method of claim 22, wherein an association rules algorithm is used to generate an association rules model to detect all possible associations between the values in the at least one predictor column and the format masks in the at least one format column.

25. The method of claim 22, further comprising:
determining a first format rule predicting a same format mask for a same format column as a second format rule;
determining whether the second format rule includes a simpler condition which is always true when the condition of the first format rule is verified; and
deleting the first format rule in response to determining that second the format rule includes the simpler condition which is always true when the condition of the first format rule is verified.

26. The method of claim 22, further comprising:
determining format rules having same predictor conditions and different format masks for the same format mask column; and merging the determined format rules into a merged format rule.

27. The method of claim 26, wherein the merged format rule has the same predictor conditions and a value for the format mask defining a set including the format masks for the determined format rules.

28. The method of claim 26, wherein format rules are generated having a low minimum confidence level that is below a minimum confidence level specified by a user, further comprising:
determining whether a sum of the confidence levels for the determined format rules having the same condition for the predictor column exceeds the minimum confidence level, wherein the determined format rules are merged into the merged format rule in response to determining that the sum of the confidence levels exceeds the minimum confidence level.

29. The method of claim 28, further comprising:
deleting the determined format rules having the same predictor conditions in response to determining that the sum of the confidence levels does not exceed the minimum confidence.

30. The method of claim 22, wherein converting the value in the format column to the format mask comprises replacing each character of a character type with a representation of the character type.

* * * * *